United States Patent Office 2,877,194
Patented Mar. 10, 1959

2,877,194

MODIFIED OIL COPOLYMERS AND PROCESS FOR PREPARING SAME

James C. Konen, Edina, and Robert A. Boller, Richfield, Minn., assignors to Archer-Daniels-Midland Company, Minneapolis, Minn., a corporation of Delaware No Drawing. Application September 4, 1953
Serial No. 378,692

13 Claims. (Cl. 260—22)

This invention relates to modified fatty acid esters and oils and more particularly to copolymers formed by reaction of said modified esters and oils with monomeric vinyl compounds, and to processes of preparing the same. More specifically, this invention relates to copolymers of monomeric vinyl compounds and modified fatty acid esters and oils that are formed by the reaction of a polyhydric alcohol with a non-conjugated oil or non-conjugated oil acid to form a partial ester which is further reacted at low temperatures to low acid values with an alpha-beta ethylenic dicarboxylic acid or anhydride. For convenience hereinafter and for the purposes of this invention, wherever used herein, the term "modified oils" is intended to include modified fatty acid esters and oils.

Previous work on the preparation of copolymers of non-conjugated oils such as linseed and soya with monomeric vinyl compounds, as styrene, resulted in heterogeneous polymers. These were cloudy, had poor solubility and formed cloudy films. With conjugated oils, e. g. tung oil, dehydrated castor and the like, clear solutions and clear films result. Small amounts of conjugated oils, e. g. tung, blended with non-conjugated, and then copolymerized with styrene, gave clear products resembling those made from conjugated oils only. In these products it is assumed that there is a reaction between the conjugated oils and the monomeric vinyl compound, e. g. styrene, to form a true copolymer.

Another method that is used to prepare clear copolymers of non-conjugated oils and monomeric vinyl compound requires the use of phthalic alkyd resin. In this case the vinyl compound forms a polymer which is soluble in the phthalic alkyd by virtue of the solubilizing properties of the relatively large number of ester groups, i. e. those formed by the reaction of phthalic acid and the polyol.

It has been discovered that the modified oils made by the special preparation procedure and low temperature esterification conditions as set forth hereinafter can be copolymerized with vinyl monomeric compounds to yield true homogeneous copolymers. These copolymers are compatible with aliphatic hydrocarbon solvents and air dry or bake to clear homogeneous films. The surface coating properties of such films have been found to be of great value in a variety of different applications, both in pigmented and in clear finishes. These copolymers display fast, hard drying properties, good water and alkali resistance, and excellent color and gloss retention.

In the previous preparation of copolymers from phthalic alkyd resins and vinyl monomers, it was pointed out in U. S. Patent No. 2,626,250, issued January 20, 1953 (to J. C. Petropoulos and L. E. Cadwell), that at least 15% phthalic modification and even further modification with unsaturated dicarboxylic acids was necessary to obtain homogeneous appearing resins and films. It has been found according to our process that non-conjugated oils or oil acids modified with as little as 2.5% of an alpha-beta ethylenic dicarboxylic acid, such as maleic acid, will yield homogeneous compatible copolymers when reacted with vinyl monomers such as styrene. By the process of this invention non-conjugated oils and acids can be converted by minimum modification to products which will readily react with vinyl monomers such as styrene to form homogeneous copolymers which have clear solutions and air dry or bake to clear, homogeneous films.

The pale color, low acid copolymers which are the product of this invention can be used either in clear or pigmented finishes. They may be used as interior architectural enamels and in other places where non-yellowing coatings are desired. They may be used in a wide variety of industrial applications, as for example, in machinery enamels, finishes for hardware and the like. Because of their good exterior durability, they may be used for such exterior purposes as trim paints and in outdoor enamels such as are used on lawn furniture and the like.

The principal object of this invention is to provide homogeneous copolymers of modified oils and vinyl monomers which give clear solutions with mineral spirits and form clear homogeneous air dried or baked films.

Another object of this invention is to provide a process for preparing homogeneous copolymers of modified oils and vinyl monomers.

It is another object of this invention to provide copolymers of modified oils and vinyl monomers prepared by reacting polyhydric alcohols with non-conjugated oils or non-conjugated oil acids to form partial esters which are further reacted to low acid values with an alpha-beta ethylenic dicarboxylic acid compound under low temperature conditions and then copolymerizing with a monomeric vinyl compound.

A further object of this invention is to provide a method by which such copolymers of modified oils and vinyl monomers may be formed.

Other objects of this invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

Broadly stated, the invention comprises first preparing a modified oil by reacting a non-conjugated drying or semi-drying oil or a non-conjugated oil acid with a polyhydric alcohol to form a partial ester. The partial ester of the polyhydric alcohol is esterfied with an alpha-beta ethylenic dicarboxylic acid compound in a low temperature esterification reaction at a temperature below about 380° F. under an inert atmosphere. The thus formed modified oil is then copolymerized with a vinyl monomer such as styrene.

In the preparation of the products of the present invention the modified oil is first prepared by reacting a material derived from a non-conjugated oil of the semi-drying or drying type having an iodine number between 100 and 200 with a polyhydric alcohol, e. g., glycerol, pentaerythritol, and the like, in an alcoholysis reaction to form a partial ester of the polyhydric alcohol. The quantity of said polyhydric alcohol should preferably be present in an amount slightly in excess, say from 2 to 35 percent, of the stoichiometric equivalent of the acid of the oil derivative and the alpha-beta ethylenic dicarboxylic acid compound which is subsequently introduced for reaction with the alcoholysis product. It is essential that the esterification reaction of the alpha-beta ethylenic dicarboxylic acid compound with the partial ester of the polyhydric alcohol be carried out at a temperature from about 300° F. to not exceeding about 380° F. and preferably not over 360° F. By maintaining a low esterification temperature and by maintaining an inert atmosphere, the alpha-beta ethylenic dicarboxylic acid or anhydride does not add to the oil to form a diene or substituted succinic acid adduct as described in the Clocker patents, U. S. Patent Nos. 2,188,882 to 2,188,890, inclusive, and 2,262,923; but instead, below 360° F., it forms true ester linkages at the available hydroxyl groups of the polyhydric alcohol-oil alcoholysis product.

The modified oil can be prepared from either non-conjugated oils or from non-conjugated oil fatty acids. The esterification of the fatty acids with a polyhydric alcohol should be carried out initially under conventional esterification conditions until a reasonably low acid number, less than 20, has been attained, followed by introduction at a lower temperature, preferably not above 360° F., of an alpha-beta ethylenic dicarboxylic acid compound. The quantity of polyhydric alcohol to be initially charged with the fatty acids should be present in a slight excess of from about 2 to 35 percent of the amount that is stoichiometrically equivalent to the fatty acids and the alpha-beta ethylenic dicarboxylic acid compound.

We are able to produce true copolymers of the modified oil and vinyl monomers by virtue of the presence of true alpha-beta ethylenic dicarboxylic acid esters. The unsaturation in this part of the modified oil molecule serves as the point of reactivity for the vinyl monomer. Thus, the monomer reacts directly with the maleic acid unsaturation. A modified oil of this type may contain as low as 3% of unsaturated acid ester, or conversely, as high as 97% oil.

In the reaction of conventional phthalic alkyds with vinyl monomeric compounds such as styrene, there exist a large number of ester groups which improve the compatibility or solubility of the vinyl polymers. However, in the case of the modified oils of this invention, there is a very low level of ester groups which number is hardly sufficient to improve the solubility of any vinyl polymers which may be present.

The copolymerization reaction is carried out at a temperature between about 250° and 325° F. but is preferably carried out at temperatures of 280° to 290° F. for optimum properties of the reaction product. These temperatures are not given as a limitation, but rather as an illustration of the approximate reaction temperature. It is essential that the reaction is carried out in the presence of an inert, organic solvent with a kauri-butanol value of about 25 or above, such as mineral spirits. The progress of the reaction can be followed by measurements of the nonvolatile content of the reaction mixture. The reaction is usually completed in 4 to 6 hours.

The modified oils for use in these copolymerization reactions with vinyl monomers must contain between 2 to 12% by weight, and preferably between 4 to 6% by weight of the alpha-beta ethylenic dicarboxylic acid compound. The expression "alpha-beta ethylenic dicarboxylic acid compound" as used herein is intended to include both acids and acid anhydrides. Included in the group of acid compounds that may be used are maleic acid, maleic anhydride, itaconic acid, itaconic anhydride and the like.

The oils or oil acids used in the preparation of the modified oils are non-conjugated oils of the semi-drying or drying types with iodine numbers between about 100 and 200 and acids of such oils. Exemplary oils that may be used include linseed oil, soybean oil, corn oil, perilla oil, safflower oil, cottonseed oil and the like.

Several types of polyhydric alcohols may be employed in the preparation of the modified oils. The quantity of polyhydric alcohol used should be the theoretical amount plus sufficient excess for substantially complete esterification. Such alcohols as pentaerythritol, polypentaerythritols, glycerol, ethylene glycol, sorbitol, mannitol and the like may be used.

It is usually customary and advantageous to employ a basic catalyst such as the oxides, hydroxides, acetates, formates and the like of metals of the alkali and alkaline earth groups of the periodic table and of zinc, cadmium and lead in the alcoholysis reaction between the oil or oil acid and polyhydric alcohol. This alcoholysis catalyst which is present in an amount of 0.03 to 0.3% by weight based on the weight of the oil and polyhydric alcohol is neutralized by the addition of 0.08 to 0.8% by weight of monobutyl acid phosphate at the completion of the alcoholysis reaction. Because of the low temperatures of esterification of alpha-beta ethylenic dicarboxylic acid compounds, it is advisable to use an acidic esterification catalyst such as paratoluene sulfonic acid, camphor sulfonic acid and the like in an amount about 0.2% by weight based on the total weight of the modified oil. A solvent azetrope of the inert aromatic hydrocarbon type such as xylol or toluol may be used during this esterification in such quantity as to maintain a reflux temperature not in excess of 360° F.

The preparation of the modified oils and the resulting products as described heretofore are per se the subject matter of a copending application Serial No. 378,669, now abandoned, filed of even date herewith by James C. Konen, one of the co-applicants of this application. The modified oils and their method of preparation thus do not comprise any part of the present invention apart from their use in the preparation of copolymers with monomeric vinyl compounds and the resulting copolymer products.

In the copolymerization of the modified oil with a vinyl monomer, the vinyl monomer should be present in the order of about 30 to 60% by weight, based on the total weight of the final reaction product. Included in the group of polymerizable, unsaturated, substituted, and unsubstituted monomeric vinyl compounds which may be used are styrene, alpha methyl styrene, vinyl toluene, divinyl benzene and the like.

The copolymerization reaction of the modified oil and vinyl monomer must be carried out in the presence of a solvent in an amount between 10 to 65% by weight and preferably between 30 to 55% by weight of solvent based on the total weight of the solvent and copolymerizable reactants. The amount of solvent governs the structure of the copolymer which is formed. Any of a large number of solvents may be used depending upon their compatibility with the reacting materials and reaction products. Generally, any inert aliphatic or aromatic hydrocarbon solvent with a kauri-butanol value in excess of about 25 will function satisfactorily as a diluent in the copolymerization reaction.

In order effectively to complete the copolymerization reaction in a reasonable time and obtain a product of desired qualities, a catalyst is generally employed. Such polymerization catalyst may be used in an amount of about 0.5 to 5% but preferably 2 to 3% by weight, based on the weight of the vinyl monomer. These catalysts are of the organic peroxide type and may include benzoyl peroxide, ditertiary butyl peroxide, tertiary butyl hydroperoxide and the like.

The non-volatile content of the final copolymerization product may vary from 45 to 70% by weight. The viscosity is dependent upon the degree of copolymerization, the type of copolymer, and the solids content of the final product. Generally, the color of the products is not over 2 (Gardner 1933 standards). The acid number is usually in the range of 1 to 4 on the non-volatile.

These vehicles can be made to dry without driers at somewhat elevated temperatures, but it is preferred to use small quantities of a cobalt naphthenate drier or like drier in the range of 0.01 to 0.1% based on the non-volatile.

The present invention will be more readily understood by the following examples which are set forth as a means of illustration and not limitation except as defined in the claims. All parts are by weight.

Example I

A styrenated modified soybean oil containig 55 percent styrene was prepared as follows: Four hundred and ten parts of "Superb" soybean oil, 17.2 parts of monopentaerythritol and 0.17 parts of lithium hydroxide monohydrate as an alcoholysis catalyst were charged to a reaction vessel equipped with a mechanical agitator, a thermometer and a supply of inert gas such as nitrogen to maintain an inert atmosphere in the reaction vessel. These materials were heated to 450° F. and held for one-half hour to complete the alcoholysis reaction. The alcoholysis product was cooled to 300° F. at which time 0.37 part of monobutyl acid phosphate was added to neutralize the lithium hydroxide. The product was cooled further to 200° F. at which time 22.5 parts of maleic anhydride, 0.9 part of paratoluene sulfonic acid and 36 parts of toluene were added. This mixture was heated to reflux temperature which did not exceed 360° F. and esterified for 8 to 10 hours. The final acid number in this step was 7. The modified oil was topped to recover the toluene by heating under vacuum. Five hundred and forty-eight parts of monomeric styrene, 1100 parts of "Amsco 46" solvent (high K-B mineral spirits, distillation range 305 to 390° F., kauri-butanol value 40.6) and 11 parts of ditertiary butyl peroxide were added to the cooled esterification product and heated to from 280° to 290° F. for 4 to 6 hours at which time the monomeric styrene had completely copolymerized with the modified soybean oil.

The progress of the copolymerization reaction was followed by checking the non-volatile content of the reaction mixture. A slight haze that develops from the neutralization of the basic catalyst in the preparation of the modified soybean oil can be readily filtered out.

The resultant copolymer solution was clear in appearance with a solids content of 47.5%, a Gardner-Holdt viscosity of about O and a Gardner color of 1+. The product air dried or baked to a clear, hard film with the addition of a small quantity of a drier such as 0.03% cobalt as naphthenate.

Example II

A styrenated, modified linseed oil containing 53 percent styrene was prepared as follows: Four hundred and ten parts of "Superb" linseed oil, 13.5 parts of monopentaerythritol and 0.17 part of lithium hydroxide monohydrate were charged to a reaction vessel fitted as in Example I. The materials were heated to 450° F. and held for one-half hour to complete the alcoholysis reaction. This product was then cooled to about 300° F. and 0.37 part of monobutyl acid phosphate was added to neutralize the alcoholysis catalyst. After further cooling to 200° F., 17.7 parts of maleic anhydride, 0.9 part of paratoluene sulfonic acid and 35.3 parts of toluene were added. The mixture was heated to reflux temperature not exceeding 360° F. and esterified for 8 to 10 hours. The toluene was recovered by heating under vacuum. Four hundred and ninety-seven parts of monomeric styrene, 867 parts of "Amsco 46" solvent and 12.5 parts of ditertiary butyl peroxide were added to the cooled esterification product and heated to from 280° to 290° F. for 4 to 6 hours to completely copolymerize the monomeric styrene with the modified linseed oil.

The final product was a clear solution, with non-volatile content of 52.5% solids, a Gardner-Holdt viscosity of about I, and a Gardner color of 2. The air dried or baked films formed a clear, hard finish with the addition of a drier such as 0.03% cobalt naphthenate.

Example III

A styrenated modified soybean oil containing 43 percent styrene was prepared by charging a reaction vessel equipped as in Example I with 410 parts of "Superb" soybean oil, 13.5 parts of monopentaerythritol and 0.17 part of lithium hydroxide monohydrate. The alcoholysis reaction was carried out by heating to 450° F. and holding for one-half hour. After cooling to 300° F., 0.37 part of monobutyl acid phosphate was added to neutralize the lithium hydroxide. The product was cooled further to 200° F. and 17.7 parts of maleic anhydride, 0.9 part of paratoluene sulfonic acid and 35.3 parts of toluene were added and the mixture was heated to reflux temperature below 360° F. The esterification was allowed to proceed for 8 to 10 hours after which the toluene was distilled off under vacuum. At this time 332 parts of monomeric styrene, 632 parts of "Amsco 46" solvent and 10 parts of ditertiary butyl peroxide were added to the cooled esterification product and heated to from 280° to 290° F. for 4 to 6 hours to completely copolymerize the monomeric styrene with the modified soybean oil.

The final copolymerization product was clear in appearance, had a non-volatile content of 55% and a Gardner-Holdt viscosity of about I. The Gardner color was 2 and the dried film was clear and homogeneous.

Example IV

A modified soybean oil copolymerized with 53 percent vinyl toluene was prepared as follows: The modified soybean oil was prepared in accordance with the modified oil preparation of Example I, except that the toluene was not removed. Five hundred and five parts of monomeric vinyl toluene, 917 parts of mineral spirits (distillation range 330° to 400° F., kauri-butanol value 36) and 10.1 parts of ditertiary butyl peroxide were added to the cooled esterification product containing the small amount of toluene and heated to from 280° to 290° F. for about 4 to 6 hours to completely copolymerize the vinyl toluene with the modified oil.

The product had a clear appearance, a non-volatile content of 50% and a Gardner-Holdt viscosity of about L. The Gardner color was 1+ and the air dried or baked film was clear and homogeneous.

Example V

A styrenated modified linseed oil containing 40 percent styrene was prepared as follows: The modified linseed oil was prepared in accordance with the preparation of the modified oil of Example II. After removal of the toluene 294 parts of monomeric styrene, 734 parts of "Amsco 46" solvent and 14.7 parts of ditertiary butyl peroxide were added to the cooled esterification product. The mixture was heated to from 280° to 290° F. for 4 to 6 hours until the modified linseed oil and the monomeric styrene completely copolymerized.

The final copolymerization product was clear in appearance, had a non-volatile content of 50%, a Gardner-Holdt viscosity of about C and a Gardner color of 2. The air dried or baked film was clear and homogeneous.

Example VI

A styrenated modified linseed oil containing 45 percent styrene was prepared as follows: "Superb" linseed oil in the amount of 477.4 parts by weight was charged to a reaction vessel fitted as in Example I along with 22.6 parts by weight of technical grade pentaerythritol and 0.20 part of lithium hydroxide monohydrate as an alcoholysis catalyst. The alcoholysis reaction was carried out at a temperature of about 450° F. over a period of about a half hour. The alcoholysis product was cooled to about 300° F. and 0.44 part of monobutyl acid phosphate were added to neutralize the alcoholysis catalyst. The product was then cooled further to about 200° F. and 35.5 parts of itaconic acid, 1 part of paratoluene sulfonic acid and 45 parts of toluene were added. This mixture was then heated to a reflux temperature which did not exceed 360° F. and held for 8 to 10 hours to complete the esterification reaction and form the modified oil product. The toluene was not topped off after preparation of the itaconic acid modified linseed oil. Monomeric styrene in an amount of 428 parts by weight, 725 parts of "Amsco 46" solvent and 12.8 parts of ditertiary butyl peroxide were added to the modified oil and heated to from 280° to 290° F. for from about 4–6 hours at which time the styrene had completely copolymerized with the itaconic acid modified linseed oil. The product had a clear appearance, a non-volatile content of 55 percent and a Gardner-Holdt viscosity of J. The Gardner color was 2. The copolymer air dried or baked to form a clear homogeneous film.

As many apparently widely different embodiments of this invention may be made without departing from the spirit and scope thereof, it is to be understood that we do not limit ourselves to the specific embodiment herein.

What we claim is:

1. A process for preparing a coating vehicle as a copolymeric derivative of an alpha-beta ethylenic dicarboxylic acid modified oil compound and a vinyl benzene compound comprising the steps of: preparing a mixture of a polyhydric alcohol in excess of at least 2% of the stoichiometric equivalent of the total acidity of the reactant components forming the said modified oil compound with an unsaturated non-conjugated fatty oil base material selected from the group consisting of non-conjugated drying and semi-drying oils and acids derived from said oils and having an iodine number between about 100 and about 200, adding a catalytic amount of a basic catalyst, effecting the formation of the partial ester of the polyhydric alcohol and fatty oil base material with said partial ester containing both ester and hydroxyl groups, neutralizing the basic catalyst, adding an acid esterification catalyst in a catalytic amount, an inert solvent, and an alpha-beta ethylenic dicarboxylic acid compound selected from the group consisting of alpha-beta ethylenic dicarboxylic acids and alpha-beta ethylenic dicarboxylic acid anhydrides in an amount of at least about 2% by weight of the combined reactants, and effecting esterification at a temperature not exceeding about 380° F. in a period of about 8 to 10 hours to form essentially a full di-ester with the available hydroxyl groups of the said partial ester, adding additional inert organic solvent with a kauri-butanol value in excess of about 25, in an amount between about 10% to 65% by weight based on the total weight of the solvent and copolymerizable reactants, adding an organic peroxide catalyst in a catalytic amount and at least about 30% polymerizable vinyl benzene compound, having a reactive vinyl group, and effecting copolymerization with the essentially fully esterified modified oil material and said vinyl compound in a period of about 4 to about 6 hours at a reaction temperature between about 250° F. and 325° F. with the production of a coating vehicle having a solids content in excess of about 43%, a Gardner-Holdt viscosity on the order of from B to O inclusive, a Gardner color not in excess of about 2 and an acid number in the range of about 1 to about 4 on the non-volatile.

2. In the process of claim 1 wherein, the said partial ester containing both ester and hydroxyl groups is a mixture of the partial esters of a polyhydric alcohol selected from the group consisting of pentaerythritol, polypentaerythritol, glycerol, ethylene glycol, sorbitol and mannitol with non-conjugated fatty acids having an iodine value between 100 and about 200.

3. In the process of claim 2 wherein, the said fatty acid material is an acid derived from the group consisting of linseed, soybean, corn, perilla, safflower and cottonseed oil material.

4. In the process of claim 1 wherein, the said alpha-beta ethylenic di-carboxylic acid compound is selected from the group consisting of maleic acid, maleic anhydride, itaconic acid, and itaconic anhydride.

5. In the process of claim 1 wherein, the said polymerizable vinyl benzene compound is selected from the group consisting of styrene, alpha methyl styrene, vinyl toluene, and divinyl benzene.

6. The process of claim 1 wherein, the said polyhydric alcohol is present in excess of about 2% to 35% of the stoichiometric acid equivalent of the total combined weight of the said fatty oil base material and the alpha-beta ethylenic di-carboxylic acid material, the said alpha-beta ethylenic dicarboxylic acid compound is present in an amount of about 2% to about 12% by weight of the said partial ester, and the said polymerizable vinyl benzene compound is present in an amount between about 30% and about 60% by weight of the reaction product.

7. A process of preparing an alpha-beta ethylenic dicarboxylic acid-pentaerythritol modified oil-vinyl copolymer from a non-conjugated fatty oil material comprising the steps consisting essentialy of preparing a mixture of a non-conjugated fatty oil base material selected from the group consisting of non-conjugated drying and semi-drying oils and acids derived from said oils and having an iodine value between about 100 and about 200 and a pentaerythritol in an amount at least equal to about 2% in excess of the stoichiometric equivalent of the total acidity of the reactant components forming the said modified oil copolymer, adding an esterification catalyst in a catalytic amount, effecting an esterification reaction producing a pentaerythritol modified oil containing both ester and hydroxyl groups adding an inert solvent, an alpha beta ethylenic dicarboxylic acid compound selected from the group consisting of alpha-beta ethylenic dicarboxylic acids and alpha-beta ethylenic dicarboxylic acid anhydrides in an amount of about 2% to about 12% by weight of said esterification product, mixing the stated components and heating the mixture to a reflux temperature not in excess of about 360° F., and effecting esterification reaction at a temperature not exceeding about 380° F. in a period of about 8 to about 10 hours; adding an inert organic solvent in an amount between 10 to 65% by weight based on the total weight of the solvent and copolymerizable reactants and with a kauri-butanol value of at least about 25, a vinyl benzene material having a reactive vinyl group, and effecting copolymerization at a temperature between about 250° F. and 325° F. for a period of about 4 to about 6 hours.

8. The copolymeric product produced by the process of claim 1.

9. The copolymeric product produced by the process of claim 2.

10. The copolymeric product produced by the process of claim 3.

11. The copolymeric product produced by the process of claim 4.

12. The copolymeric product produced by the process of claim 5.

13. The copolymeric product produced by the process of claim 7.

References Cited in the file of this patent

UNITED STATES PATENTS

| | | |
|---|---|---|
| 2,412,176 | Schwarcman | Dec. 3, 1946 |
| 2,559,465 | Root | July 3, 1951 |
| 2,559,466 | Root | July 3, 1951 |
| 2,587,411 | Ullmann et al. | Feb. 26, 1952 |
| 2,600,457 | Wynstra | June 17, 1952 |